United States Patent [19]
Eakin

[11] Patent Number: 5,628,599
[45] Date of Patent: May 13, 1997

[54] ANCHORED FASTENER

[76] Inventor: Karl F. Eakin, 5021 Francis Ave., Chino, Calif. 91710

[21] Appl. No.: 503,278

[22] Filed: Jul. 17, 1995

[51] Int. Cl.[6] .............................. F16B 39/24; F16B 43/02
[52] U.S. Cl. ........................ 411/163; 411/156; 411/544; 411/957
[58] Field of Search ..................... 411/155, 156, 411/163, 164, 173, 177, 183, 187, 188, 544, 957, 959

[56] References Cited

U.S. PATENT DOCUMENTS

| | | | |
|---|---|---|---|
| 843,720 | 2/1907 | Waddell et al. | 411/162 X |
| 2,675,844 | 4/1954 | Knohl | 411/957 X |
| 2,735,470 | 2/1956 | Poupitch | 411/155 |
| 3,032,089 | 5/1962 | Gutshall | 411/163 X |
| 3,194,292 | 7/1965 | Borowsky | 411/163 X |
| 3,332,464 | 7/1967 | Castel | 411/155 |
| 3,480,061 | 11/1969 | Leistner | 411/177 |
| 4,377,275 | 3/1983 | Fager et al. | 411/177 X |
| 4,543,763 | 10/1985 | Ernst et al. | 411/187 X |
| 5,188,441 | 2/1993 | Rugel | 411/156 X |
| 5,348,432 | 9/1994 | Nagayama | 411/177 X |

*Primary Examiner*—Neill R. Wilson
*Attorney, Agent, or Firm*—Leo R. Carroll

[57] ABSTRACT

In a first embodiment of this invention, a fastener having a flat thin body with sharp profusions thereon is anchored in a workpiece so that relative rotation is prevented between the anchored fastener and the workpiece. The sharp protrusions form anchoring legs which cut into the softer material of the work piece. These legs may be spike or tack shaped, and may be forced into the workpiece by pressing or hammering in a direction orthogonal to the surface of the workpiece. For sandwich applications between pairs of workpieces, the anchoring legs may be disposed on both sides of the body. In addition, individual anchoring legs may include a sharp edge which will cut into the work piece in the rotational direction. In a second embodiment, the thin surfaces of the body may be curved so that the body of the anchoring legs is deformed by the compression of a nut being tightened on a bolt. This elastic deformation provides an axial retention force in a manner similar to a lock washer. The surface curverture is generally that of a segment of a sphere, however multiple curvertures or corrugations can be used.

3 Claims, 2 Drawing Sheets

ANCHORED FASTENER

BACKGROUND OF THE INVENTION

1. Field of the Invention

This invention relates generally to the field of fasteners, and in particular to those washer type devices which incorporate anchoring legs to prevent rotation of the device in the workpiece. This invention combines the above anti-rotation features with an axial-loaded lock washer function.

2. Description of Related Art

Many types of special fasteners exist in the prior art. An example of these is described in U.S. Pat. No. 3,304,830 by Shackelford for an Expansible Hollow Rivet Having A Polygonal Shank. In U.S. Pat. No. 3,550,217, Collyer describes an invention that relates to a plastics fastener for attachment to an apertured workpiece and comprises a head for abutment against the outer surface of the workpiece and a shank for a snap-engagement through the aperture.

Another class of frequently used types is the internally threaded fastener. These conventional threaded insert devices are placed in a hole in the workpiece, which is generally thin gauge metal sheet or metal plate stock and then, with the use of a special tool, are collapsed. Structural components may then be mounted to the workpiece by means of a bolt or screw in conjunction with the threaded insert. Exemplary fasteners of this type are found in U.S. Pat. Nos. 3,304,830 and 3,750,525.

In U.S. Pat. No. 3,750,525, Waters et al. shows an improved collapsible threaded insert device for securing items to a plate-like workpiece of the type consisting of an annular flange portion integrally attached to an internally threaded, collapsible shank portion. The improvement comprises the addition of various mechanical gripping means formed on the undersurface of the flange to frictionally engage the workpiece when the threaded insert device has been collapsibly secured thereto, thus, increasing the resistance to rotation of said insert within the workpiece.

More recent designs include U.S. Pat. No. 5,118,235 to Dill for a washer molded from a polymeric material and useful with a fastener having a head and shank, such as, for example, a screw or a drive pin, and a fastening assembly comprised of the washer and such a fastener, is a disclosed. The fastener head is contained within a washer socket with the fastener shank extending through a washer aperture. An integral flap hinged from a lateral wall portion of the washer socket is used to substantially cover the fastener head.

Other designs include U.S. Pat. No. 3,903,573 to Wilson for "Arcuate, stamp down fasteners for sheet securement." Rapata's U.S. Pat. No. 2,836,215 for "Plastic Nut-Like Fastener with Resilient Wings;" O'Conner's U.S. Pat. No. 3,384,938 for "Pliable Material Clamp;" Schuplin's U.S. Pat. No. 3,417,438 for a "Deformable Polymeric Fastening Device;" Heidelberger's U.S. Pat. No. 3,609,822 for a "Fastening Device;" and Bowerman's U.S. Pat. No. 3,686,616 for a "Fastener."

None of the above provide both rotational and axial restraint with the simplicity of this invention.

SUMMARY OF THE INVENTION

In a first embodiment of this invention, a fastener having a flat thin body with sharp protrusions thereon is anchored in a workpiece so that relative rotation is prevented between the anchored fastener and the workpiece. The sharp protrusions form anchoring legs which cut into the softer material of the work piece. These legs may be spike or tack shaped, and may be forced into the workpiece by pressing or hammering in a direction orthogonal to the surface of the workpiece. For sandwich applications between pairs of workpieces, the anchoring legs may be disposed on both sides of the body. In addition, individual anchoring legs may include a sharp edge which will cut into the work piece in the rotational direction.

An aperture in the body of the fastener is provided for passage of a fastening bolt, generally the aperture will be round, however it may be specially shaped to match any downward type of protuberances below the head of the bolt. As an example, a square aperture would be necessary to accommodate a carriage bolt.

In a second embodiment, the thin surfaces of the body may be curved so that the body of the anchoring legs is deformed by the compression of a nut being tightened on a bolt. This elastic deformation provides an axial retention force in a manner similar to a lock washer. The surface curverture is generally that of a segment of a sphere, however multiple curvertures or corrugations may be used. With this design, both axial and rotational restraint is assured.

The prime objective of this invention is to provide a novel one-piece anchored fastener.

It is a further object of this invention to provide novel one-piece fastener members which are adapted to be hammered into and locked to work pieces without requiring complementary fastener members such as screws, bolts or the like.

It is a yet another object of this invention to provide novel one-piece fastener members which are adapted to secured into work pieces by means of complementary fastener members such as screws, bolts or the like, without requiring hammering.

It is a still another object of this invention to provide novel one-piece fastener members having apertures therein which are keyed to unique complementary fastener members such as carriage bolts so as to become rotationally secure when said complementary fastener member is turned.

It is a further object of this invention to provide a novel one-piece fastener having a curved planar head capable of being axially compressed when tightened so as to provide a lock washer function.

An additional object of this invention is to provide novel one-piece fastener members which may be economically manufactured by stamping or molding.

Yet another object of the invention is to provide novel one-piece fastener members which may be fabricated of metal or suitable plastic compositions.

Another object of the invention is to provide fastener devices which are easily and quickly assembled into the work piece.

The above and other objects, features and advantages of the present invention will become more apparent from the following description when making reference to the detailed description and to the accompanying sheets of drawings.

DESCRIPTION OF THE PREFERRED EMBODIMENT

Figure 1:
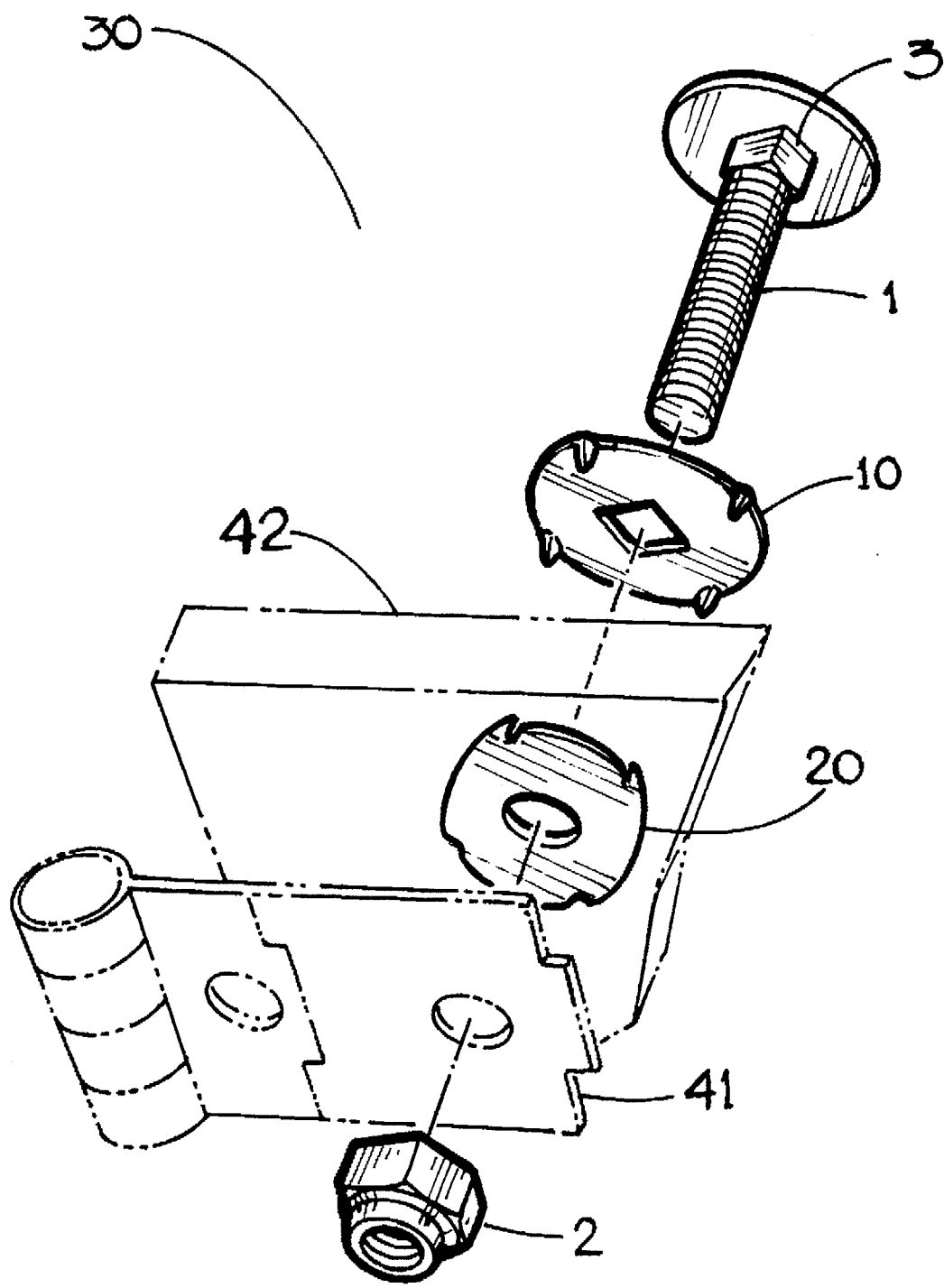
FIG. 1 shows an exploded isometric view of a pair of anchored fasteners in accordance with this invention assembled between a work piece panel and a hinge, together with a tightening carriage bolt and elastic stop nut.

FIG. 1 illustrates an exploded isometric view of a general nut and bolt fastening system 30, using anchored fastener assemblies 10 and 20 in accordance with preferred embodiments of this invention. The fastening system comprises a general threaded carriage bolt 1 with matching elastic stop nut 2. The bolt 1 has a squared neck 3 which is keyed to a mating aperture in fastener 10 to prevent turning of the bolt during nut assembly. The example shows a general hinge 31 and a work piece panel such as a wooden board 32. The board 42 may comprise any material susceptible to undesirable turning of the threaded bolt 1.

Anchored fastener 10 is shown with four triangular anchor legs which protrude toward the workpiece 41. Each protrusion is pointed so as to orthogonally engage the surface of the work piece 42, and has a sharp edge which will cut into workpiece when the fastener is rotated relative to the workpiece. Of course, many other shapes of protrusion may be used, such as a tack shape, and the quantity of four is optional. Disposition of the legs at the periphery of the body is made in order to permit more legs, and to increase the restraining torque.

In FIG. 1, fastener 10 is shown with a body curverture away from the plane of the workpiece. This curvature of the thin surfaces of the body is used so that the body of the anchoring legs is deformed by the compression of a nut being tightened on a bolt. This elastic deformation provides an axial retention force in a manner similar to a lock washer. The surface curverture is generally that of a segment of a sphere, however multiple curvertures or corrugations may be used. With this design, both axial and rotational restraint is assured.

Figure 2:
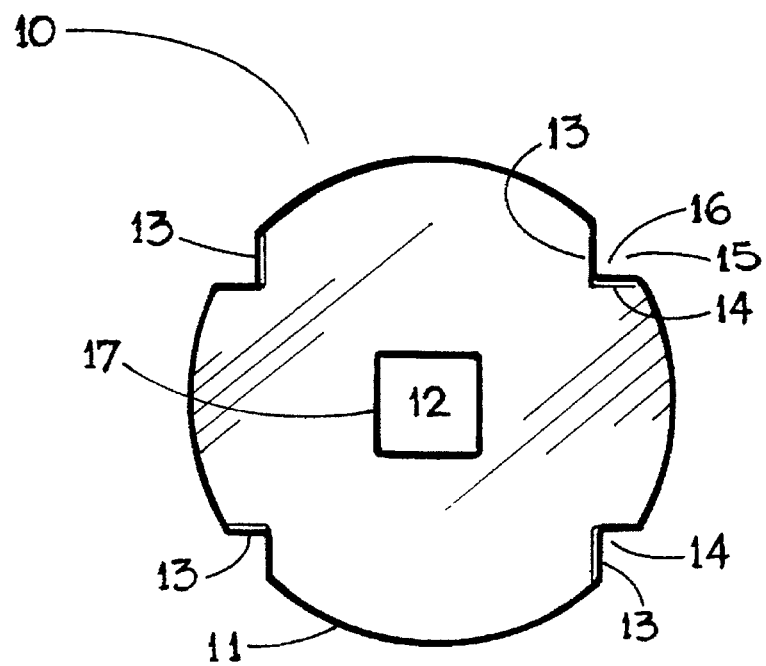
FIG. 2 shows a plane bottom view of the anchored fastener showing the relationship of four anchor legs.

FIG. 2 shows a plane bottom view of the anchored fastener showing the relationship of four anchor legs on circular blank 11 of a first preferred embodiment of this invention. Center aperture 17 in the circular blank 11 forms a square hole 12 substantially in the center of the blank. Center aperture 17 adapts hole 12 to the squared neck 3 of the carriage bolt 1. Aperture 17 may also be tapped so as to permit use as a nut plate.

A second set of rim cuts 13 angle inward from the circumference of the blank 11. Bases 14 lie between the rim cuts 13 and opposite circular arcs 15, so that bases 14, circular arcs 15, and the rim cuts 13 form pointed triangular pointed anchor legs 16. The cuts are easily made in stamping operations.

Figure 3:
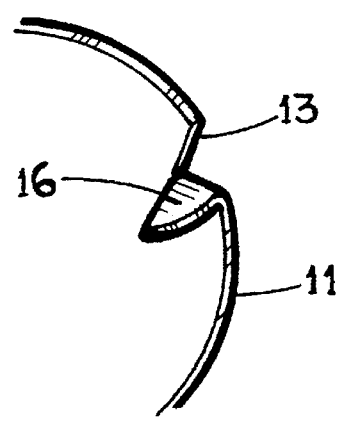
FIG. 3 shows an expanded perspective sector of one of the anchor legs of FIG. 2.

Referring to FIG. 3, the pointed anchor legs 16 bend about the bases 14 to form the sharp legs substantially normal to the plane of the blank 11. Stamping operations easily accomplish the cuts as well as bend the pointed anchor legs 16 in one easy operation.

In operation the pointed anchor legs 16 of the anchor fastener 10 imbed into a softer material such as wood or plastic, substantially lock the anchor fastener in rotation. This prevents rotation of the bolt 1, seated in the square hole 12, while tightening nut 2 as in FIG. 1.

The foregoing description and drawings were given for illustrative purposes only, it being understood that the invention is not limited to the embodiments disclosed, but is intended to embrace any and all equivalents alternatives, modifications and rearrangements of elements falling within the scope of the invention as defined by the following claims.

I claim:

1. A fastener anchored in a workpiece for receipt of fastening bolt means, comprising:

a body portion having first and second opposite surfaces thereon, each said surface having outside edges thereon, and inside edges therein defining a keyed aperture therethrough for passage of said fastening bolt means, wherein said inside edges defining the keyed aperture in said body portion are shaped so as to conform to the shape of mating neck protrusions attached to and extending below the head of a fastening bolt, whereby said bolt is rotationally restrained from rotation relative to said anchored fastener, and a plurality of pointed anchoring leg means protruding approximately orthogonally from said first surface of said body portion, for engagement with said work piece, said pointed anchoring leg means having at least one sharpened side edge disposed normal to the surface of said workpiece, whereby said sharpened side edge cuts into the workpiece, so that relative rotation is prevented between said anchored fastener and said workpiece.

2. A fastener anchored in a workpiece as recited in claim 1 wherein said anchoring leg means are tack shaped for spiked engagement with said workpiece.

3. A fastener anchored in a workpiece as recited in claim 1 wherein said anchoring leg means are disposed at the edges of said body portion.

* * * * *